(12) United States Patent
Boday et al.

(10) Patent No.: US 9,000,148 B2
(45) Date of Patent: Apr. 7, 2015

(54) FLAME RETARDANT CELLULOSE ACETATE

(71) Applicant: International Business Machines Corporation, Armonk, NY (US)

(72) Inventors: Dylan J. Boday, Tucson, AZ (US); Joseph Kuczynski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/734,171

(22) Filed: Jan. 4, 2013

(65) Prior Publication Data

US 2014/0194616 A1    Jul. 10, 2014

(51) Int. Cl.
*C09K 21/14* (2006.01)
*C08K 5/5337* (2006.01)
*C08L 1/12* (2006.01)

(52) U.S. Cl.
CPC ..................................... *C09K 21/14* (2013.01)

(58) Field of Classification Search
CPC ......... C09K 21/14; C08K 5/5337; C08L 1/12
USPC ........................................ 536/69, 72, 62, 124
See application file for complete search history.

(56) References Cited

U.S. PATENT DOCUMENTS

| | | | |
|---|---|---|---|
| 3,321,330 A | * | 5/1967 | Mohney ........................ 442/144 |
| 6,992,151 B2 | | 1/2006 | Wang et al. |
| 2009/0025144 A1 | | 1/2009 | Tanaka et al. |

FOREIGN PATENT DOCUMENTS

| | | |
|---|---|---|
| CN | 102190814 A | 9/2011 |
| CN | 102549056 A | 7/2012 |
| CN | 102561036 A | 7/2012 |
| CN | 102757580 A | 10/2012 |
| EP | 1112314 B1 | 4/2007 |
| JP | 3885263 B2 | 2/2007 |
| WO | 2012116886 A1 | 9/2012 |

OTHER PUBLICATIONS

U.S. Appl. No. 13/734,199, entitled "Flame Retardant Cellulose", filed Jan. 4, 2013.

* cited by examiner

*Primary Examiner* — Patrick Lewis
*Assistant Examiner* — Everett White
(74) *Attorney, Agent, or Firm* — Nicholas L. Cadmus

(57) ABSTRACT

Flame retardant cellulose acetate is prepared comprising cellulose acetate flakes and an organophosphate compound bonded to the cellulose acetate flakes. Accordingly, the bonded phosphate-functional group provides the cellulose acetate flakes with pendant phosphate ester functionality. Numerous phosphate derivatives can be envisaged that will accomplish the intended task.

10 Claims, No Drawings

FLAME RETARDANT CELLULOSE ACETATE

BACKGROUND

The present invention relates in general to the field of flame retardants. More particularly, the present invention relates to flame retardant cellulose acetate.

Cellulose acetate is the acetate ester of cellulose. Cellulose acetate is prepared through the esterification of acetic acid with cellulose. Cellulose acetates with different properties are obtained depending on the degree of substitution. The reactivity of the cellulose may be uneven. The D-glucose unit is the fundamental repeating structure of cellulose and has three hydroxyl groups which can react to form acetate esters. The most common form of cellulose acetate flake has an acetate group on approximately two of every three hydroxyls. This cellulose diacetate is known as secondary acetate, or simply as "acetate".

Cellulose acetate is partially or completely acetylated cellulose that contains acetyl ($C_2H_3O$) groups. Cellulose acetate is a straight chain polymer. The multiple hydroxyl groups on the glucose from one chain form hydrogen bonds with oxygen atoms on the same or on a neighbor chain, holding the chains firmly together side-by-side and forming microfibrils. Many properties of cellulose acetate depend on its chain length or degree of polymerization (e.g., the number of glucose units that make up one polymer molecule).

SUMMARY

Aspects of an embodiment of the present invention disclose a flame retardant cellulose acetate. The flame retardant cellulose acetate comprises cellulose acetate flakes and an organophosphate compound bonded to the cellulose acetate flakes. Accordingly, the bonded phosphate-functional group provides the cellulose acetate flakes with pendant phosphate ester functionality. Numerous phosphate derivatives can be envisaged that will accomplish the intended task.

DETAILED DESCRIPTION

Cellulose acetate is a bio-derived plastic currently utilized in injection molded plastic components for the information technology industry. However, due to degradation of the physical properties upon compounding with suitable flame retardant additives, UL 94 V0 specifications can not be met with existing cellulose acetate formulations. UL 94 is a plastics flammability standard released by Underwriters Laboratories of the USA. The standard classifies plastics according to how they burn in various orientations and thicknesses. From lowest (least flame-retardant) to highest (most flame-retardant). Consequently, there is a need for flame retardant cellulose acetate.

In brief summary, in accordance with one embodiment of the present invention, by binding a nonhalogenated, RoHS (Restriction of Hazardous Substances Directive) compliant flame retardant to individual cellulose acetate flakes, flame retardant cellulose acetate can be produced. The hydroxyl groups (—OH) of cellulose acetate can be partially or fully reacted with various reagents to afford derivatives with useful properties. Phosphate esters are well known flame retardants for use in the plastics industry. An organophosphate compound reacted with cellulose acetate may produce cellulose acetate flakes with pendant phosphate ester functionality.

In accordance with one embodiment of the present invention, the flame retardant cellulose acetate comprises cellulose acetate flakes and an organophosphate compound covalently bonded to the cellulose acetate flakes. The flame retardant cellulose acetate may be prepared by reacting cellulose acetate flakes and an organophosphate compound. The reaction may be carried out in any suitable solvent (with subsequent removal of hydrogen chloride (HCl) by rinsing with buffered water) or in the gas phase (i.e., by passing the vapor of an organophosphate compound such as diphenyl phosphoryl chloride over the cellulose acetate flakes). The substituted cellulose acetate flakes may then be fabricated into the desired geometry with the end result being a flame retardant article.

The cellulose acetate flakes may be commercially available cellulose acetate flakes. The cellulose acetate flakes may comprise cellulose acetate and/or cellulose diacetate, or any combination thereof. Cellulose diacetate comprises two acetate radicals on each unit of D-Glucose of the cellulose molecule.

Cellulose acetate may be synthesized by the following process. Cellulose $(C_6H_{10}O_5)_n$ is reacted with acetic anhydride $(CH_3CO)_2O$ in the presence of sulfuric acid $(H_2SO_4)$. It is then put through a controlled, partial hydrolysis to remove the sulfate and a sufficient number of acetate groups $(CH_3COO^-)$ to give the product the desired properties. The most common form of cellulose acetate flake has an acetate group on approximately two of every three hydroxyls. This cellulose diacetate is known as secondary acetate, or simply as "acetate". The reaction to synthesize cellulose acetate is illustrated generally in Scheme (1), wherein N is an integer.

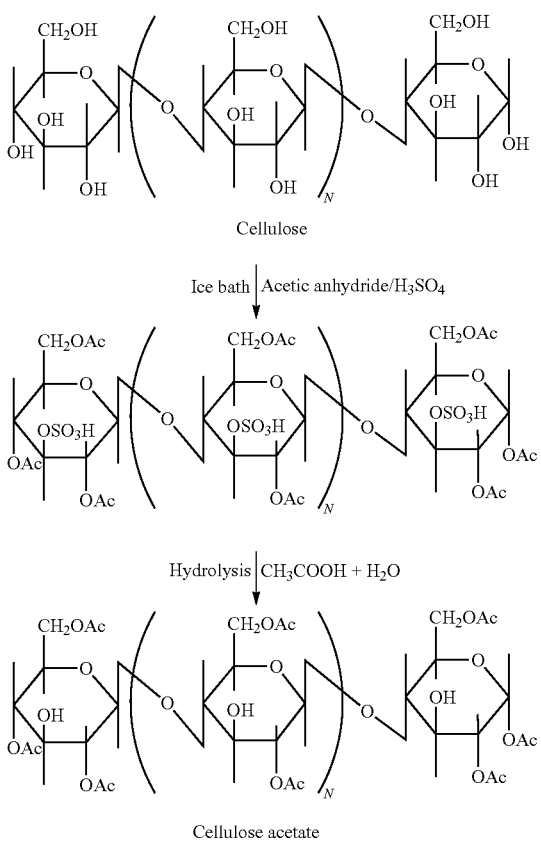

Scheme (1)

The organophosphate compound covalently bonded to the cellulose acetate flakes may be one or more alkyl phosphates and/or one or more aryl phosphates; and combinations thereof. More particularly, the organophosphate compound may be one or more substituted or unsubstituted butyl phosphates and/or one or more substituted or unsubstituted phenyl phosphates; and combinations thereof. For example, the organophosphate compound may be a substituted phenyl phosphate of Formula (1):

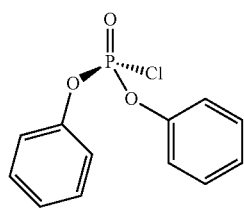

Formula (1)

DIPHENYL PHOSPHORYL CHLORIDE

Diphenyl phosphoryl chloride may either be synthesized by reacting phenol ($C_6H_5OH$) and phosphorus(V) oxychloride ($POCl_3$), or purchased from a commercial source. The reaction to synthesize diphenyl phosphoryl chloride is illustrated generally in Scheme (2).

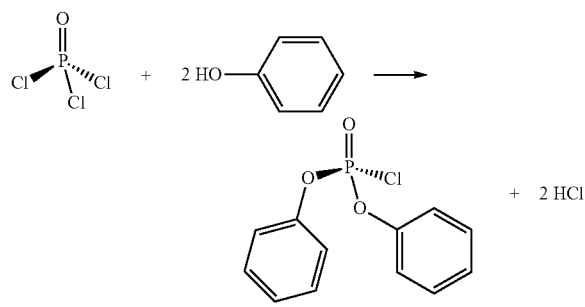

Scheme (2)

In another example, the organophosphate compound may be a substituted phenyl phosphate of Formula (2):

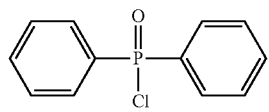

Formula (2)

DIPHENYLPHOSPHINIC CHLORIDE

Diphenylphosphinic chloride may be purchased from a commercial source.

It will be appreciated by those skilled in the art that, in accordance with one embodiment of the present invention, the intent is to covalently bind a phosphate-functional group to the cellulose acetate flakes to provide the cellulose acetate flakes with pendant phosphate ester functionality. As such, numerous phosphate derivatives can be envisaged that will accomplish the intended task.

Phosphate esters are well known flame retardants for use in the plastics industry. The pendant phosphate ester functionality provides the level of ignition resistance required. Phosphorus based flame retardants form a protective (char) layer which resists high temperatures and protects the underlying product from attack by oxygen and radiant heat. This minimizes the development of a full fire and increases escape time.

EXAMPLE

The following example is intended to illustrate the invention to those skilled in the art and should not be interpreted as limiting the scope of the invention set forth in the claims.

Flame Retardant Cellulose Acetate Preparation

The flame retardant cellulose acetate may be prepared as follows. A known quantity of diphenyl phosphoryl chloride is reacted with cellulose acetate flakes to form the substituted cellulose acetate with pendant phosphate ester groups. The degree of substitution can be controlled by varying the quantity of diphenyl phosphoryl chloride in the reaction mixture. The mer unit for cellulose acetate contains a single reactive alcohol, so depending on the level of substitution required to achieve the UL 94 V0 specification (which is typically ≤10 wt % of the formulation), the diphenyl phosphoryl chloride concentration may be adjusted accordingly. Many of the OH groups of cellulose have already been reacted with acetic anhydride to form the cellulose acetate. The diphenyl phosphoryl chloride is being reacted with a portion of the remaining OH groups to create the pendant phosphate ester.

For example, for a cellulose acetate flake with two acetate groups present per mer, there is a single reactive hydroxyl remaining (shown in Formula 3).

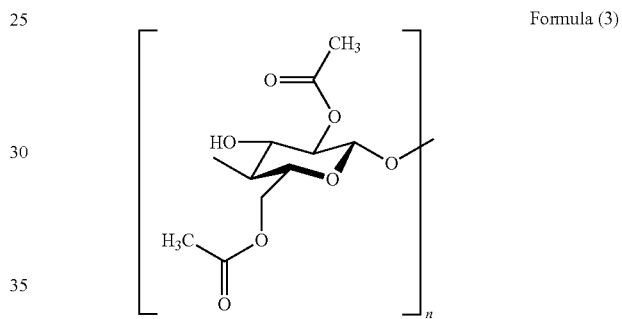

Formula (3)

For each mer of cellulose acetate ($C_{10}H_{14}O_7$, 246 g/mer), there is one equivalent of hydroxyl which is available to react with diphenyl phosphoryl chloride. Therefore, for 25 g of cellulose, there are 0.1 equivalents of reactive hydroxyl groups. Reacting 10% of the primary hydroxyls requires 0.01 equivalents of diphenyl phosphoryl chloride, or 2.68 g. Again, depending on the level of phosphorylation required, these ratios can be easily altered.

First, tetrahydrofuran is added to an argon-flushed round bottomed flask equipped with a stir bar and an addition funnel. Cellulose acetate flakes and pyridine are added to the flask and cooled to 0° C. in an ice bath. Diphenyl phosphoryl chloride is then added dropwise with stirring. Proportions of the reactants are such that the resulting diphenyl phosphoryl chloride starting concentration (i.e., after addition of diphenyl phosphoryl chloride is completed) is about 0.5M. Two equivalents of the cellulose acetate flake are provided per mole of diphenyl phosphoryl chloride, and 2 moles of pyridine are provided per mole of diphenyl phosphoryl chloride. Pyridine:HCl begins to precipitate as soon as the diphenyl phosphoryl chloride addition begins. After the diphenyl phosphoryl chloride addition is complete, the reaction mixture is allowed to warm to room temperature (25° C.) and stirred for about 24 hours. The ratio of pyridine to diphenyl phosphoryl chloride can vary, but a 2:1 ratio is suitable.

The pyridine:HCl is filtered from the mixture, leaving a clear, colorless liquid phase behind. The solvent is removed in a rotary evaporator and the excess pyridine is distilled off under vacuum. The isolated product is dissolved in acetonitrile, passed through an alumina column, desolvated and dried under vacuum at 65° C. The above reaction is illustrated generally in Scheme (3), wherein y and n are integers.

Scheme (3)

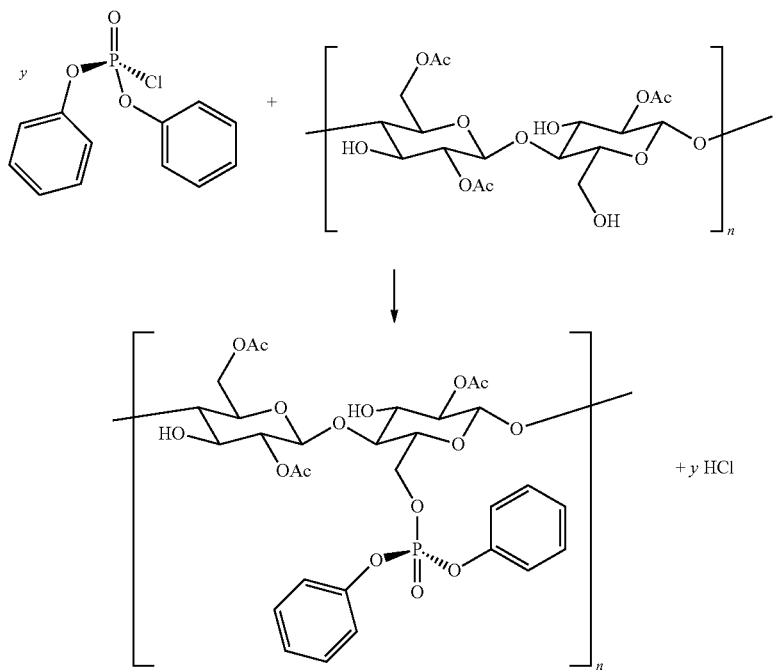

What is claimed is:

1. A flame retardant cellulose acetate, comprising:
   cellulose acetate flakes; and
   an organophosphate compound covalently bonded to the cellulose acetate flakes.

2. The flame retardant cellulose acetate of claim 1, wherein the organophosphate compound is selected from the group consisting of alkyl phosphates, aryl phosphates, and combinations thereof.

3. The flame retardant cellulose acetate of claim 1, wherein the organophosphate compound is selected from the group consisting of substituted butyl phosphates, unsubstituted butyl phosphates, substituted phenyl phosphates, unsubstituted phenyl phosphates and combinations thereof.

4. The flame retardant cellulose acetate of claim 1, wherein the organophosphate compound is diphenyl phosphoryl chloride.

5. The flame retardant cellulose acetate of claim 1, wherein the organophosphate compound is diphenylphosphinic chloride.

6. A method of making a flame retardant cellulose acetate, comprising the steps of:
   providing cellulose acetate flakes; and
   reacting the cellulose acetate flakes with an organophosphate compound to produce a flame retardant cellulose acetate comprising an organophosphate compound covalently bonded to the cellulose acetate flakes.

7. The method of claim 6, wherein the organophosphate compound is selected from the group consisting of alkyl phosphates, aryl phosphates, and combinations thereof.

8. The method of claim 6, wherein the organophosphate compound is selected from the group consisting of substituted butyl phosphates, unsubstituted butyl phosphates, substituted phenyl phosphates, unsubstituted phenyl phosphates and combinations thereof.

9. The method of claim 6, wherein the organophosphate compound is diphenyl phosphoryl chloride.

10. The method of claim 6, wherein the organophosphate compound is diphenylphosphinic chloride.

* * * * *